(12) United States Patent
Dickinson et al.

(10) Patent No.: US 7,610,537 B2
(45) Date of Patent: Oct. 27, 2009

(54) METHOD AND APPARATUS FOR TESTING MULTI-CORE MICROPROCESSORS

(75) Inventors: Dan Jeffrey Dickinson, Essex Junction, VT (US); Robert D. Kenney, Austin, TX (US); Christina Lynne Newman-LaBounty, Stowe, VT (US); Ronald Gene Walther, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 11/278,615

(22) Filed: Apr. 4, 2006

(65) Prior Publication Data

US 2007/0260823 A1    Nov. 8, 2007

(51) Int. Cl.
*G01R 31/28*    (2006.01)
*G06F 11/00*    (2006.01)

(52) U.S. Cl. .................... 714/733; 714/734; 714/30
(58) Field of Classification Search ............ 714/733, 714/734, 30
See application file for complete search history.

(56) References Cited

U.S. PATENT DOCUMENTS 6,097,647 A * 8/2000 Zagar et al. ............ 365/201

7,478,025 B1 * 1/2009 Fuller et al. .............. 703/13
2006/0200719 A1 * 9/2006 Keller .................... 714/732

OTHER PUBLICATIONS

Pham et al., Overview of the Architecture, Circuit Design, and Physical Implementation of a First-Generation Cell Processor, Jan. 2006, IEEE, vol. 41, No. 1, pp. 179-196.*
U.S. Appl. No. 11/295,057, filed Dec. 6, 2005, Kiryuk et al.

* cited by examiner

*Primary Examiner*—Jacques H. Louis Jacques
*Assistant Examiner*—John J Tabone, Jr.
(74) *Attorney, Agent, or Firm*—Yee & Associates, P.C.; Matthew B. Talpis

(57) ABSTRACT

A computer implemented method, data processing system, and computer usable code are provided for testing multi-core microprocessors. A test process initiates testing on communication bus interfaces associated with a set of processor cores on the multiprocessor in which the communication bus interfaces are disabled and wherein the testing uses a set of isolation test sequences to obtain results. The process identifies a set of functional processor cores in the set of processor cores based upon the results. The process also initiates a ramp logic built-in self-test to test a ramp associated with a functional processor core in the set of functional processor cores, wherein the ramp logic built-in self-test determines if the communication bus interface associated with functional processor core in the set of functional processor cores is functional.

20 Claims, 4 Drawing Sheets

*(PRIOR ART)*
*FIG. 1*
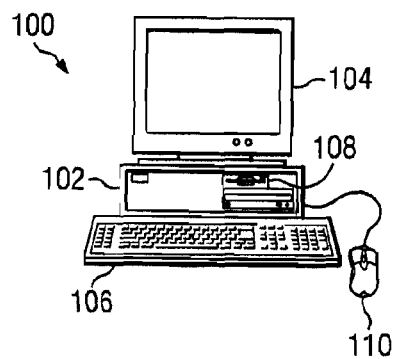
*FIG. 2* *(PRIOR ART)*
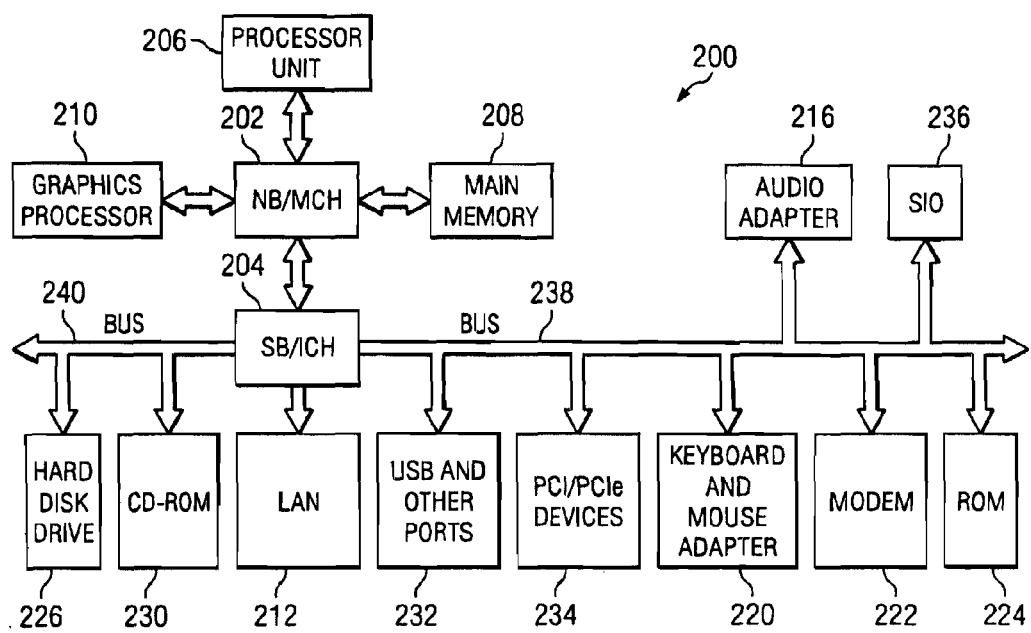

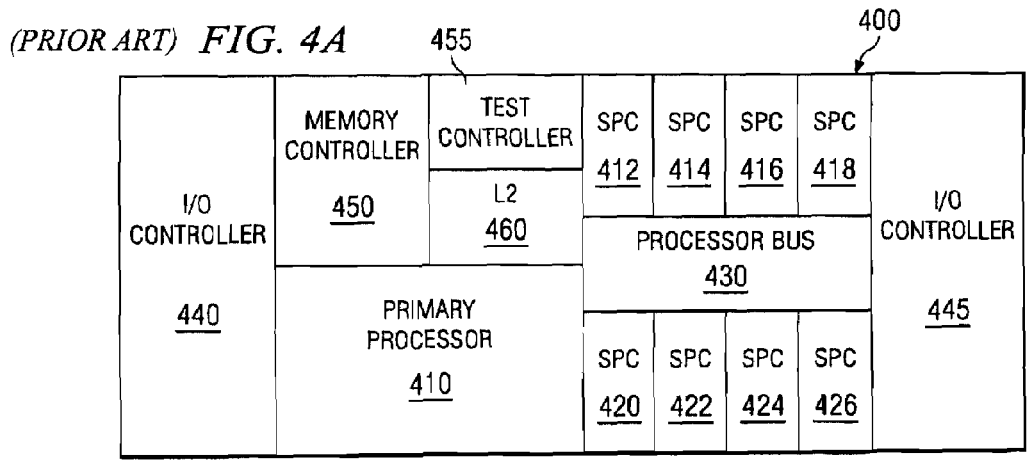
*(PRIOR ART)* FIG. 4A
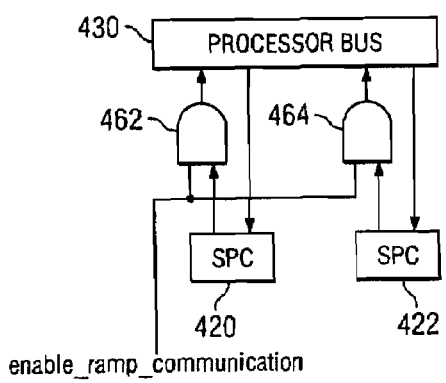
FIG. 4B
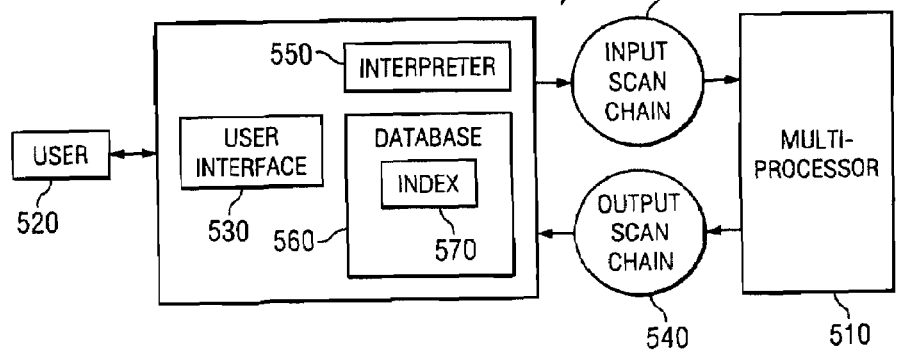
FIG. 5

METHOD AND APPARATUS FOR TESTING MULTI-CORE MICROPROCESSORS

BACKGROUND

1. Field of the Invention

The present application relates generally to testing electronic circuits. More specifically, the present application relates to a computer implemented method, apparatus, and computer usable code for testing multi-core microprocessors.

2. Description of the Related Art

A multi-core microprocessor, referred to hereinafter as a "multiprocessor", is an integrated circuit (IC) having two or more independent processor cores. A processor core is an independent processor or computational unit capable of executing threads or other processes independently of the other processor core(s). The processor core(s) in a multiprocessor are typically plugged into a single processor socket, and share the same platform interface which connects each core to memory, input/output, and storage resources. This architecture permits enhanced performance, reduced power consumption, and simultaneous execution of multiple independent tasks or threads.

As processors become more complex, there are more opportunities for defects to arise during manufacture that may impair or impede proper operation of the processor. However, a multiprocessor may be considered to be functional even if some portions of the multiprocessor contain defects. For example, the first-generation Cell Broadband Engine™ (BE) processor, which is a multi-core processor chip, is comprised of a single primary 64-bit Power PC® processor core (PPC) and eight synergistic processor cores (SPCs). Cell Broadband Engine™ processor is a heterogeneous multiprocessor. A heterogeneous multiprocessor is a multiprocessor in which each processor core is capable of executing a different set of instructions. In other words, all the processor cores in the multiprocessor do not use the same instruction set.

The Power PC® processor core is a general purpose central processing unit which is used to run an operating system and provide services. The synergistic processor cores are independent processors capable of executing processes independently from the other synergistic processor cores. The synergistic processor cores are optimized for computational density. Thus, the Power PC® processor core is a primary processor while synergistic processor cores are considered sub-processors.

A high-speed memory controller and high-bandwidth bus interface are also integrated on-chip to permit moving data between components of the processor. This modular chip is designed to operate without requiring all eight of the synergistic processor cores to function correctly.

A multiprocessor chip in which one or more functional units or other portions of the multiprocessor are defective and one or more functional units remain functional is referred to herein as a "partial good" chip. As used herein, a functional unit is a part or component of a multiprocessor that operates or performs one or more functions within the multiprocessor. For example, a processing unit is a functional unit of a multiprocessor. A processing unit is a core on a multiprocessor chip that performs processing functions. Examples of a processing unit include a primary processor such as Power PC® processor core or a sub-processor such as a synergistic processor core. If a defect is detected in a single functional unit, such as a synergistic processor core, the defective synergistic processor core can be disabled and the multiprocessor can still be used with the remaining functional unit(s) as a partial good multiprocessor chip.

Conventional testing techniques utilized during manufacture of processors typically only produce a value or result that indicates a fail or error in the multiprocessor as a whole. The testing values do not indicate whether the error(s) arose in a single functional unit of the multiprocessor, multiple functional unit(s), or identify which functional units caused the error(s). Therefore, conventional testing techniques result in many salvageable partial good chips being incorrectly identified as wholly defective and unnecessarily discarded.

SUMMARY

The different aspects of the illustrative embodiments provide a computer implemented method, apparatus, and computer usable code for testing multi-core microprocessors. A test process initiates testing on communication bus interfaces associated with a set of processor cores on the multiprocessor in which the communication bus interfaces are disabled and wherein the testing uses a set of isolation test sequences to obtain results. The process identifies a set of functional processor cores in the set of processor cores based upon the results. The process also initiates a ramp logic built-in self-test to test a ramp associated with a functional processor core in the set of functional processor cores, wherein the ramp logic built-in self-test determines if the communication bus interface associated with functional processor core in the set of functional processor cores is functional.

BRIEF DESCRIPTION OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of the illustrative embodiments when read in conjunction with the accompanying drawings, wherein:

FIG. 1 is depicts a pictorial representation of a network of data processing systems in which aspects of the illustrative embodiments may be implemented;

FIG. 2 depicts a block diagram of a data processing system in which aspects of the illustrative embodiments may be implemented;

FIG. 4A depicts an exemplary diagram of a multiprocessor bus on a architecture-compliant multiprocessor in which aspects of the illustrative embodiments may be implemented in accordance with an illustrative embodiment;

FIG. 4B depicts an exemplary block diagram of a communication bus and communication bus interface in accordance with an illustrative embodiment;

FIG. 5 depicts an exemplary diagram of a dataflow when a multiprocessor chip is tested in accordance with an illustrative embodiment.

DETAILED DESCRIPTION OF THE PREFERRED EMBODIMENT

Figure 3:
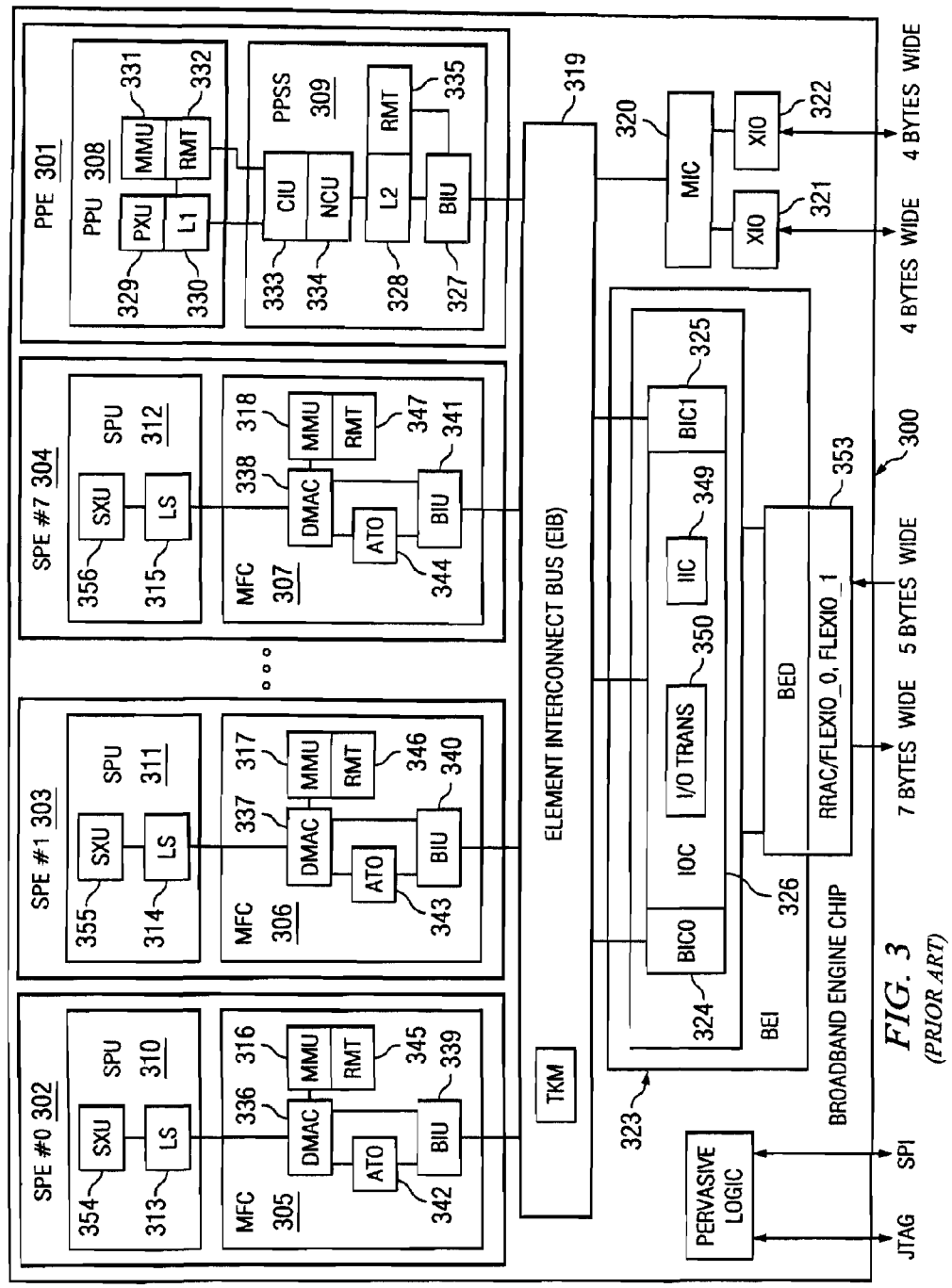
FIG. 3 depicts an exemplary diagram of a Cell Broadband Engine™ architecture-compliant multiprocessor in which aspects of the illustrative embodiments may be implemented in accordance with an illustrative embodiment.

With reference now to the figures and in particular with reference to FIG. 1, a pictorial representation of a data processing system in which the aspects of the present invention may be implemented. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

With reference now to FIG. 2, a block diagram of a data processing system is shown in which aspects of the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 202 and a south bridge and input/output (I/O) controller hub (ICH) 204. Processor unit 206, main memory 208, and graphics processor 210 are connected to north bridge and memory controller hub 202. Processor unit 206 contains a set of one or more processors. When more than one processor is present, these processors may be separate processors in separate packages. Alternatively, the processors may be multiple cores in packages. Further, the processors may be multiple multi-core units. Graphics processor 210 may be connected to the MCH through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204.

An operating system runs on processor unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor unit 206. The processes of the present invention are performed by processor unit 206 using computer implemented instructions, which may be located in a memory such as, for example, main memory 208, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the embodiments may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

FIG. 3 is an exemplary diagram of a Cell Broadband Engine™ chip in which aspects of the illustrative embodiments may be implemented in accordance with an illustrative embodiment. Cell Broadband Engine™ chip 300 is a single-chip, heterogeneous multiprocessor implementation directed toward distributed processing targeted for media-rich applications such as game consoles, desktop systems, and servers.

Cell Broadband Engine™ chip 300 may be logically separated into the following functional components: Power PC® processor element (PPE) 301 using a reduced instruction set computer (RISC) instruction set; and synergistic processor elements (SPE) 302, 303, and 304 comprising synergistic processor units (SPU) 310, 311, and 312 using a single instruction multiple data (SIMO) instruction set; and memory flow controllers (MFC) 305, 306, and 307. Although synergistic processor elements 302-304 and Power PC® processor element 301 are shown by example, any type of processor element may be supported. Exemplary Cell Broadband Engine™ chip 300 implementation includes one Power PC® processor element 301 and eight synergistic processor elements, although FIG. 3 shows only three synergistic processor elements (SPEs) 302, 303, and 304. The synergistic processor element (SPE) of a Cell Broadband Engine™ processor uses a SIMO processor architecture designed to accelerate media and data streaming workloads.

In these examples, each synergistic processor element includes one synergistic processor unit (SPU) 310, 311, or 312 with its own local store (LS) area 313, 314, or 315 and a dedicated memory flow controller (MFC) 305, 306, or 307 that has an associated memory management unit (MMU) 316, 317, or 318 to hold and process memory protection and access permission information. Once again, although synergistic processor units are shown by example, any type of processor unit in a multiprocessor may be supported. In addition, although Cell Broadband Engine™ chip 300 is a heterogeneous multiprocessor in these examples, the aspects of the embodiments of the present invention can also be implemented with a non-heterogeneous multiprocessor, as well.

Cell Broadband Engine™ chip 300 implements element interconnect bus (EIB) 319 and other I/O structures to facilitate on-chip and external data flow. Element interconnect bus 319 serves as the primary on-chip bus for Power PC® processor element 301 and synergistic processor elements 302, 303, and 304. In addition, element interconnect bus 319 interfaces to other on-chip interface controllers that are dedicated to off-chip accesses. The on-chip interface controllers include the memory interface controller (MIC) 320, which provides two extreme data rate I/O (XIO) memory channels 321 and 322, and broadband engine interface (BEI) unit 323, which provides two high-speed external I/O channels and the internal interrupt control for the Cell Broadband Engine™ chip 300. The Cell Broadband Engine™ interface unit 323 is implemented as bus interface controllers (BIC0 & BIC1) 324 and 325 and I/O interface controller (IOC) 326. The two high-speed external I/O channels connected to a polarity of RRAC interfaces providing the flexible input and output (FlexIO_0 & FlexIO_1) 353 for the Cell Broadband Engine™ 300.

Each synergistic processor unit 310, 311, or 312 has a corresponding local store area 313, 314, or 315 and synergistic execution units (SXU) 354, 355, or 356. Each individual synergistic processor unit 310, 311, or 312 can execute instructions (including data load and store operations) only from within its associated local store area 313, 314, or 315. For this reason, all required data transfers to or from storage elsewhere in a system is performed using memory flow controller direct memory access operations via synergistic processor unit's 310, 311, and 312 dedicated memory flow controllers 305, 306, and 307.

A program running on synergistic processor unit 310, 311, or 312 only references its own local store area 313, 314, or 315 using a local store address. However, each synergistic processor unit's local store area 313, 314, or 315 is also assigned a real address (RA) within the overall system's memory map. This allows privileged software to map a local store area to the effective address (EA) of a process to facilitate direct memory access transfers between the local store of one synergistic processor unit and the local store of another synergistic processor unit. Power PC® processor element 301 may also directly access any synergistic processor unit's local store using an effective address.

The memory flow controller direct memory access data transfer commands always use one local store address and one effective address. The local store address directly addresses the local store memory of the associated synergistic processor unit 310, 311, or 312 corresponding to the memory flow controller command queues on which the direct memory access command request is placed. However, the effective address may be arranged to access any other memory storage area in the system, including local store areas 313, 314, and 315 of the other synergistic processor elements 302, 303, and 304.

Main storage is shared by Power PC® processor unit 308, the power processor element (PPE) 301, synergistic processor elements (SPEs) 302, 303, and 304, and I/O devices in a system. All information held in this level of storage is visible to all processors and devices in the system. Programs reference this level of storage using an effective address. Since the memory flow controller synergistic processor unit command queue, the memory flow controller proxy command queue, and the control and status facilities are mapped to the effective address space, it is possible for power processor element 301 to initiate direct memory access operations involving a local store area associated with any of synergistic processor elements (SPEs) 302, 303, and 304.

A synergistic processor unit program accesses main storage by generating and placing a direct memory access data transfer command, with the appropriate effective address and local store address, into its memory flow controllers (MFCs) 305, 306, or 307 command queue for execution. When executed, the required data are transferred between its own local store area and main storage. Memory flow controllers (MFCs) 305, 306, or 307 provide a second proxy command queue for commands generated by other devices such as the power processor element (PPE) 301. The proxy command queue is typically used to store a program in local storage prior to starting the synergic processor unit. Proxy commands can also be used for context store operations.

The effective address part of the data transfer is much more general, and can reference main storage, including all synergistic processor unit local store areas. These local store areas are mapped into the effective address space. The data transfers are protected. An effective address is translated to a real address through a memory management unit. The translation process allows for virtualization of system memory and memory protection.

Power PC® processor element 301 on Cell Broadband Engine™ chip 300 consists of 64-bit Power PC® processor unit 308 and Power PC® storage subsystem (PPSS) 309. Power PC® processor unit 308 contains processor execution unit (PXU) 329, level 1 (L1) cache 330, memory management unit (MMU) 331 and replacement management table (RMT) 332. Power PC® storage subsystem 309 consists of cacheable interface unit (CIU) 333, non-cacheable unit (NCU) 334, level 2 (L2) cache 328, replacement management table (RMT) 335 and bus interface unit (BIU) 327. Bus interface unit 327 connects Power PC® storage subsystem 309 to the element interconnect bus 319.

Synergistic processor unit 310, 311, or 312 and memory flow controllers (MFCs) 305, 306, and 307 communicate with each other through unidirectional channels that have capacity. The channel interface transports messages to and from memory flow controllers 305, 306, and 307, synergistic processor units 310, 311, and 312. Bus interface units 339, 340, and 341 connect memory flow controllers 305, 306, and 307 to element interconnect bus (EIB) 319.

Memory flow controllers 305, 306, and 307 provide two main functions for synergistic processor units 310, 311, and 312. Memory flow controllers 305, 306, and 307 move data between synergistic processor unit's 310, 311, or 312 local store (LS) area 313, 314, and 315 and main storage. Additionally, memory flow controllers 305, 306, and 307 provide synchronization facilities between synergistic processor units 310, 311, and 312 and other devices in the system.

Memory flow controllers 305, 306, and 307 implementation has four functional units: direct memory access controllers (DMAC) 336, 337, and 338, memory management units (MMU) 316, 317, and 318, atomic units (ATO) 342, 343, and 344, replacement management tables (RMT) 345, 346, and 347, and bus interface units (BIU) 339, 340, and 341. Direct memory access controllers 336, 337, and 338 maintains and processes memory flow controller command queues (MFC CMDQs), which consist of a memory flow controller synergistic processor unit command queue (MFC SPUQ) and a memory flow controller proxy command queue (MFC PrxyQ). The sixteen-entry, memory flow controller synergistic processor unit command queue handles memory flow controller commands coming from the synergistic processor unit channel interface. The eight-entry, memory flow controller proxy command queue processes memory flow controller commands coming from other devices through memory mapped input and output (MMIO) load and store operations. A typical direct memory access command moves data between the local store and the main storage. The main storage is addressed by the effective address direct memory access command operand. The local store is addressed by the local store address (LSA) direct memory access command operand.

In a virtual mode, memory management units 316, 317, and 318 provides the address translation and memory protection facilities to handle the effective address translation request from direct memory access controllers 336, 337, and 338 and send back the translated address. Each synergistic memory management unit maintains a segment lookaside buffer (SLB) and a translation lookaside buffer (TLB). The segment lookaside buffer translates an effective address to a virtual address (VA) and the translation lookaside buffer translates the virtual address coming out of the segment lookaside buffer to a real address.

Atomic units 342, 343, and 344 provide the level of data caching necessary for maintaining synchronization with other processing units in the system. Coherency with other caches in the system is maintained. Atomic direct memory access commands provide the means for the synergist processor elements to request synchronization with other units.

The main function of bus interface units 339, 340, and 341 is to provide the synergistic processor elements 302, 303, and 304 with an interface to the element interconnect bus.

Element interconnect bus 319 provides a communication path between all of the processors on Cell Broadband Engine™ chip 300 and the external interface controllers attached to element interconnect bus 319.

Memory interface controller 320 provides an interface between element interconnect bus 319 and one or two of extreme data rate I/O cell memory channels 321 and 322. Extreme data rate (XDR™) dynamic random access memory (DRAM) is a high-speed, highly serial memory provided by Rambus. The extreme data rate dynamic random access memory is accessed using a macro provided by Rambus, referred to in this document as extreme data rate I/O cell memory channels 321 and 322.

Memory interface controller 320 is only a slave on element interconnect bus 319. Memory interface controller 320 acknowledges commands in its configured address range(s), corresponding to the memory in the supported hubs.

Bus interface controllers 324 and 325 manage data transfer on and off the chip from element interconnect bus 319 to either of two external devices. Bus interface controllers 324 and 325 may exchange non-coherent traffic with an I/O device, or it can extend element interconnect bus 319 to another device, which could even be another Cell Broadband Engine™ chip. When used to extend the element interconnect bus, coherency is maintained between caches in the Cell Broadband Engine™ and caches in the external device attached.

I/O interface controller 326 handles commands that originate in an I/O interface device and that are destined for the coherent element interconnect bus 319. An I/O interface device may be any device that attaches to an I/O interface such as an I/O bridge chip that attaches multiple I/O devices or another Cell Broadband Engine™ chip 300 that is accessed in a non-coherent manner. I/O interface controller 326 also intercepts access to element interconnect bus 319 that are destined to memory-mapped registers that reside in or behind an I/O bridge chip or non-coherent Cell Broadband Engine™ chip 300, and routes them to the proper I/O interface. I/O interface controller 326 also includes internal interrupt controller (IIC) 349 and I/O address translation unit (I/O Trans) 350.

Although specific examples of how the different components may be implemented have been provided, these examples are not meant to limit the architecture in which the aspects of the illustrative embodiments may be used. The aspects of the illustrative embodiments may be used with any multi-core processor system.

During manufacture of a multiprocessor chip, a chip tester is utilized to test each multiprocessor chip for performance and functionality of the chip. A chip tester is a device configured to input data into a multiprocessor chip and receive output from the multiprocessor chip in return. The tester then compares the output data to expected values to determine if one or more parts of the multiprocessor chip are defective in accordance with the illustrative embodiments.

A user selects a particular test to perform on a given multiprocessor chip. In response, the tester inputs an appropriate test pattern corresponding to the selected test as an input chain to the multiprocessor. The test pattern can be a pseudorandom test pattern such as might be used during logical built-in self-tests. However, during other tests, the input vectors are not random, such as during a full wafer test. In such cases, the scan chains are specific targeted data patterns.

In response to receiving one or more test patterns, the multiprocessor logic processes and/or reacts to the test pattern and returns an output chain to the chip tester. The chip tester analyzes the output chain and compares the output to one or more expected values. The processor known to operate properly generates an expected value.

Although the target logic of a multiprocessor under test can include multiple functional units, the test data output from all functional units are sometimes combined into a single signature value, such as during a logical built-in self-test. A logic built-in self-test is a test designed to apply a pseudorandom pattern as input to a multiprocessor chip's internal scan chain, initiate a functional cycle, and capture the multiprocessor chip's response as a signature in a multiple input signature register (MISR). In the case of logic built-in self-tests, a defect in one functional area of the multiprocessor can cause test results, indicating one or more failures in other areas of the multiprocessor. Moreover, the test results generally produce only a single pass/fail type of result indicating whether a multiprocessor is functional or defective. Thus, a single error in one functional unit of a multiprocessor can cause the test value to incorrectly indicate that the entire multiprocessor chip is defective when only a single functional unit is defective.

A functional unit of a multiprocessor is a part or component of the multiprocessor that operates or performs one or more functions within the multiprocessor chip. A functional unit of a multiprocessor at a first level of the multiprocessor includes, but is not limited to, a processing unit, such as a synergistic processor core. For example, in FIG. 4A, each processing unit, such as processing units 410-418 are functional units. In addition, memory control 450, and input/output controller 440 and 445 are also functional units within multiprocessor 400. A multiprocessor chip in which one or more functional units or other portions of the multiprocessor are defective and one or more functional units remain functional is referred to herein as a "partial good" chip. For example, if a single processing unit is defective, the defective processing core can be disabled and the multiprocessor can still be used with the remaining functional processing unit(s). Such a multiprocessor chip is a partial good multiprocessor.

As used herein, a processing unit is a core on a multiprocessor chip that performs processing functions. Examples of a processing unit include a primary processor such as Power PC® processor core or a sub-processor such as a synergistic processor core. Processing units are composed of many functional units. A functional unit of a processing unit, which can be considered to be located at a second level of the multiprocessor, is a part or component of the processing unit that operates or performs one or more functions within the processing unit. For example, a functional unit of a processing unit at this second level includes, but is not limited to, one or more cache(s) located on the processing unit. A processing unit in which one or more functional units or other portions of the processing unit are defective and one or more functional units remain functional is referred to herein as a "partial good" processing unit. For example, a processing unit in which one cache on the processing unit is defective but one or more other cache(s) on the processing unit are functional is a partial good processing unit of the multiprocessor chip.

The illustrative embodiments of the present invention are presented in the context of testing and isolating functional units of a multiprocessor at the first level or processor level of the multiprocessor. However, the aspects and illustrative embodiments for testing multiprocessor chips can be applied at the second level or functional unit level of an individual processing unit, as well. For example, the processes of the illustrative embodiments can be applied at the second level/functional unit level of a processing unit to determine whether one or more cache(s) on the processing unit are functional. If a selected number of the cache(s) are functional, the particular processing unit within the multiprocessor is a partial good processing unit.

Thus, multiprocessor chip test result(s) that fail to indicate whether a fail result is caused by a particular functional unit of a multiprocessor or a processing unit rather than indicative that the multiprocessor as a whole is defective can result in unnecessary discarding of salvageable partial good multiprocessor chips.

Thus, in accordance with the illustrative embodiments, a computer implemented method, apparatus, and computer usable code are provided for isolating functional units in a multiprocessor during testing such that error data generated by one functional unit does not corrupt the test data generated by another functional unit. In this manner, partial good testing is utilized to isolate and identify defective functional units during testing.

FIG. 4A depicts an exemplary diagram of a multiprocessor bus on a Cell Broadband Engine™ architecture-compliant multiprocessor in which aspects of the illustrative embodiments may be implemented. A multiprocessor integrated circuit 400 in accordance with one embodiment is shown. Multiprocessor 400 is a multiprocessor chip such as Cell Broadband Engine™ chip 300 in FIG. 3. Multiprocessor 400 includes a primary processor core 410 and eight synergistic processor cores 412-426. Synergistic processor cores 412-426 are general purpose sub-processor units capable of performing a variety of processing functions.

In this illustrative embodiment, all communication between processing units 410-426 is enabled by processor bus 430. Processor bus 430 is a high speed communication ring, such as element interconnect bus 319 in FIG. 3. Processor bus 430 enables processing units, such as primary processor 410 and synergistic processor cores 412-426 to communicate with each other, as well as with other functional units 440-460 associated with multiprocessor 400 that provide support functions. For example, memory flow controller 450 controls the flow of data to and from processing units 410-426 and to local memory store areas, such as cache L2 460 within multiprocessor 400. Level 2 (L2) cache 460 provides a level two cache for temporary storage of data on multiprocessor 400. Level two cache 460 is cache memory located on multiprocessor but it is faster for the central processing unit to access than regular RAM because it is located on the same chip as the multiprocessor chip. A level 1 cache memory is also on the same chip as multiprocessor 400. A processing unit can access a level one cache faster than level two cache 460 but level two cache 460 holds more data.

The interface between a processing unit, such as processing unit 420, and processor bus 430 is a communication bus interface, which is also referred to herein as a ramp. FIG. 4B shows an exemplary block diagram of a communication bus and communication bus interface in accordance with an illustrative embodiment. FIG. 4B provides a more detailed view of two ramps associated with two synergistic processor units in a section of the multiprocessor illustrated in FIG. 4A. Communication bus interface 462 provides a ramp for synergistic processor core 420 to interface with processor bus 430 for the output of data.

A chip tester connected to multiprocessor 400 in FIG. 4A transmits a tester pattern to multiprocessor 400. The tester pattern sets a separate bit that enables or disables a ramp associated with a particular processing unit. The bit that is set by the tester pattern gates the necessary signals from the processing unit to processor bus 430. A ramp is a communication bus interface, such as communication bus interfaces 462 and 464 to enable communication to flow into and out of the particular synergistic processor core associated with the ramp. Each ramp associated with a particular synergistic processor core may be either enabled or disabled at any given time during testing. An enabled ramp permits a processing unit associated with that ramp to output data to other functional units of multiprocessor 400.

In this illustrative embodiment, communication bus interface 462 associated with synergistic processor core 420 and communication bus interface 464 associated with synergistic processor core 422 are enabled ramps. Synergistic processor cores 420 and 422 send output data through communication bus interface 462 and 464, respectively, to processor bus 430. Although FIG. 4B only depicts a communication bus interface associated with synergistic processor units 420-422 in accordance with this illustrative embodiment, a communication bus interface is associated with each processing unit, such as processing units 410-426.

Each individual ramp associated with a functional unit can be enabled or disabled independently of every other ramp. In other words, communication bus interface ramp 462 and 464 for synergistic processor core 420 and 422 may have one ramp enabled and the other ramp disabled simultaneously. Thus, a user testing a multiprocessor in a test mode can select to enable all ramps, disable all ramps, or enable one or more ramps and disable one or more other ramps. A test mode is a mode in which a tester can access the components and logic of the multiprocessor chip for testing in a variety of ways. After all testing is complete, the chip is placed in a functional mode in which a user has more limited access to the multiprocessor chip components and logic. In accordance with an illustrative embodiment, a ramp for a primary processor core is always enabled.

When communication bus interface 462 ramp associated with synergistic processor core 420 is disabled, synergistic processor core 420 is effectively isolated from sending or receiving communication or data to or from other functional units 410-418 and 422-460 in the multiprocessor. Synergistic processor core 420 generates output signals that are gated. In other words, when communication bus interface 462 ramp associated with synergistic processor core 420 is disabled, synergistic processor core 420 is capable of receiving data as input but is not capable of sending data to processor bus 430 as output. In this manner, one or more functional units of multiprocessor 400 can be isolated from other functional units of multiprocessor 400 during partial good testing.

Partial good testing permits a test engineer to test a multiprocessor for a specified number of functional processing units on a multiprocessor chip, rather than testing a multiprocessor for functionality as a whole. In other words, if a multiprocessor has nine (9) processing units, such as synergistic processor cores 412-426, an engineer can test for a specified number of functional processing cores ranging from zero functional synergistic processor cores to nine functional synergistic processor cores. If a specified number of functional synergistic processor cores are five out of a total of eight synergistic processor cores, a multiprocessor testing with three or fewer defective synergistic processor cores is a partial good multiprocessor that is considered a functional multiprocessor. However, if the multiprocessor tests with four or more defective synergistic processor cores, the multiprocessor would be considered to be a defective or unsalvageable multiprocessor chip.

The illustrative embodiments provide a test process that permits the isolation of faulty components or nonfunctional units in a multiprocessor. During a partial good test process, test values for each functional unit are compared to a reference containing expected values for each functional unit. A nonfunctional unit can be identified by comparing a test value generated by the given processing core to an expected result for the given processing core.

FIG. 5 is an exemplary diagram of a dataflow when a multiprocessor chip is tested in accordance with an illustrative embodiment. Tester 500 is a testing device for inputting test data into multiprocessor chip 510. User 520 specifies a particular test sequence for testing one or more functional units on multiprocessor chip 510 via user interface 530. A user can select a test sequence, such as the test sequences illustrated in FIG. 6 below, for initiation by tester 500. For example, user 520 can select to run a ramp test sequence to test communication ramps associated with each processor core in multiprocessor 510. In response to initiation of a given test sequence, tester 500 sends one or more input scan chain (s) 535 to multiprocessor 510. Multiprocessor logic processes input scan chain(s) 535 or reacts to the test stimuli and generates output scan chain(s) 540 in response. Tester receives one or more output scan chain(s) 540 from multiprocessor.

Interpreter 550 translates and analysis output scan chain(s) 540 generated by multiprocessor functional units to generate the actual test result. Interpreter 550 compares the test result to an expected test result value in database 560. The interpreter determines whether a particular functional unit in multiprocessor 510 is defective based upon the comparison of the actual test result for the functional unit to an expected test result for the functional unit. Database 560 optionally comprises index 570. Index 570 contains an index of expected values that should be generated by a particular functional unit in multiprocessor 510 during a given test sequence. After all tests are run on multiprocessor 510, tester 500 initiates eFuses to blow the fuses associated with defective processor cores. An eFuse is an on-chip device. During testing mode, a tester runs an eFuse sequence or pattern into the multiprocessor. A first part of the eFuse pattern scans in a desired value that each eFuse is supposed to have. A second part of the eFuse pattern initiates blowing of a fuse associated with an identified defective synergistic processor core. Once the fuses are blown on the identified defective processor cores, the defective processor cores are permanently disabled in the functional mode. However, in accordance with an illustrative embodiment, a tester can gain access to a disabled synergistic processor core in a test mode even after the fuse is blown.

In accordance with the illustrative embodiments, a multiprocessor may be tested by performing a testflow in which an isolation test in a set of isolation test sequences is initiated. This set of isolation test sequences contains one or more isolation test sequences. An isolation test is a test that can be used to isolate fails in a synergistic processor core. During an isolation test, one or more synergistic processor cores have a ramp disabled to permit testing of one or more processor cores in isolation. As discussed above, if a ramp associated with a synergistic processor core is disabled, that processor core is effectively prevented from sending or receiving data from other functional units in the multiprocessor chip. An isolation test is performed in order to identify multiprocessor chips with partial good quality. A multiprocessor has partial good quality if a threshold number of processor cores are determined to be functional.

The process performs a set of isolation tests with all communication bus interfaces associated with a set of processor cores on the multiprocessor disabled. The set of isolation tests includes, but is not limited to, one or more of the following: a logic built-in self-test (LBIST), an array built-in self-test (ABIST), an architectural verification program test, a special scan test, a full wafer general scan design test, and/or a shift register test. The term "set of isolation tests" refers to a single isolation test or two or more isolation tests.

A given processor core cannot send output if a communication bus interface associated with the given processor core is disabled. Disabling every communication bus interface effectively isolates each synergistic processor core from every other synergistic processor core on the multiprocessor. In accordance with one illustrative embodiment, the set of processor cores comprises all the synergistic processor cores located on a particular multiprocessor being tested. Thus, testing on communication bus interfaces associated with a set of processor cores on a multiprocessor is initiated in which the communication bus interfaces are disabled. The testing uses a set of isolation test sequences to obtain results. As used herein, the term "set of processor cores" can include a single processor core or two or more processor cores.

The process also initiates a set of non-isolation test sequences. A non-isolation test is a test that requires all functional units of the multiprocessor chip to return an expected value or expected result in response to running the test. In other words, the logic that is targeted by a non-isolation test must be all good in order to pass a non-isolation test. A non-isolation test does not require disabling of one or more communication bus interface(s) associated with one or more processor core(s) on the multiprocessor. Thus, in accordance with an illustrative embodiment, a fail in a non-isolation test indicates that a multiprocessor chip is not salvageable. The set of non-isolation tests can include, but is not limited to, one or more of the following: an input/output controller test, a Rambus test, and/or a Freerun test.

A set of identified functional processor cores are identified based upon the results of the set of isolation test(s) and the set of non-isolation test(s). A functional processor core is a core that returns an expected value or expected result in response to performing one or more tests.

In accordance with an illustrative embodiment, a full wafer scan test (FW30_sr) test sequence tests the majority of the logic in a multiprocessor. In this illustrative example, two dedicated chains are input for each synergistic processor core. A fail on either of the two chains associated with a particular processor core indicates that the particular processor core is a defective processor core. In this illustrative embodiment, two dedicated chains are input into a particular processor core in parallel rather than utilizing a single longer input chain in order to reduce test time for the input chain. However, a single input chain could also be utilized for each particular processor core rather than utilizing two shorter input chains in parallel. The ramps are disabled during the full wafer shift test but it is not necessary to disable the ramps because the full wafer shift register test is a scan test. Therefore, a full wafer shift register test can be classified as either an isolation test or a non-isolation test.

A full wafer general scan design test sequence is an isolation test that tests for a majority of all other faults left untested by an LBIST isolation sequence. The general scan design test is a DC pattern that operates at a slower speed than the processor core being tested. The process runs this sequence with all ramps disabled to isolate all processor cores. The process runs two dedicated input chains through each synergistic processor core. A fail on either of the two chains associated with a particular processor core identifies the particular processor core as a defective synergistic processor core.

A full wafer general scan design functional patterns test logic surrounding the scan chains. The results of this full wafer test generated by one functional unit can bleed over into the results generated by another functional unit. Therefore, the full wafer general scan test is classified as an isolation test.

A logic built-in self-test (LBIST) sequence is an isolation test. A logic built-in self-test is an on-chip engine that tests logic. In other words, a logic built-in self-test is performed in an LBIST architecture located on the multiprocessor chip itself. The logic built-in self-test stimulus data are provided by a pseudorandom pattern generator. The process scans this data down scan channels. A functional sequence run by a central controller initiates a functional sequence to test the target logic. The results are captured back into scan latches. The results are scanned into the multiple input signature registers which create a pseudorandom signature for all captured data. The signature is compared to the expected signature from simulation. The pseudorandom data can also be weighted towards one or zero to attack other difficult to test logic.

Each synergistic processor unit has a logic built-in self-test architecture located on-chip. In the illustrative example in FIG. 4A, there are fifteen logic built-in self-test satellites on multiprocessor chip 400. Eight of the satellites are associated with the eight synergistic processor cores 412-426. A central controller operates each satellite in sync so that each satellite runs the same sequence. However, each satellite can have a different data and/or signatures. In other words, a user can customize the weight, seed, masks, and signatures for a satellite. The functional test sequence run on the multiprocessor is the same across all of the satellites.

The logic built-in self-test sequence is initiated with all ramps to processor cores disabled to isolate each synergistic processor core from every other synergistic processor core. Therefore, a fail in one synergistic processor core will not propagate to other functional units of the multiprocessor, such as the other synergistic processor cores, communications bus, primary processor, or input/output controllers. During an LBIST isolation sequence, the process runs AC sequences with all the communication ramps disabled. An AC sequence is a sequence that is run at the same speed as the processor operates.

In contrast, a DC sequence is a test that is run at a speed slower than that the speed at which the processor operates. For example, a full wafer GSD test has deterministic data that is stored in a tester memory. The tester can only operate at 200 megahertz. Therefore, the test must operate at 200 megahertz because it is controlled by the tester. A logic built-in self-test is able to run independently because logic built-in self-test is only dependent on the tester to initially program the controller.

A logic built-in self-test isolation sequence is run for each processor core in parallel. The results of the logic built-in self-test sequence for a particular processor core are stored in a Multiple Input Signature Register (MISR) associated with that particular processor core. Thus, the process can identify a particular defective synergistic processor by determining whether the test results for a particular synergistic processor core stored in the multiple input signature register for that particular processor core indicates a fail.

An array built-in self-test sequence "ABIST" tests on-chip memory arrays. The Array BIST test is an on-chip test engine. An array built-in self-test performs an AC sequence that operates at the same speed as the processor core being tested. The array built-in self-test only tests cells within arrays. This is an isolation test. However, because the test is local to the array, it is not necessary to disable the ramps to the synergistic processor cores. In other words, the test is inherently an isolation test without requiring any action to isolation individual processor cores.

In this illustrative example, each synergistic processor core outputs five scan chains in response to the Array BIST sequence. If a fail is indicated on any one of the five scan chains associated with a particular synergistic processor core, the particular synergistic processor core associated with that scan chain will be identified as a defective processor core.

An architectural verification program "AVP" sequence is a mini functional program used to test the logic that is inactive during structural tests. Test results indicating a defect in one functional unit of the multiprocessor will not contaminate the test results generated by other functional units. This test sequence can run with the all ramps to the synergistic processor cores enabled. Therefore, the architectural verification program test is inherently an isolation test.

A special scan test sequence "SST_sr" tests the "Power-On Reset" sequence to activate the multiprocessor safely. This is a basic test utilizing less than one percent of the chip logic. A dedicated input chain is input into the multiprocessor in which one dedicated input chain runs through each functional unit of the multiprocessor. Thus, a single dedicated chain is run through each synergistic processor core. An output scan chain is received from each processor core in response to running the special scan sequence. The scan chains output as a result of this test sequence are interpreted and analyzed to determine if any of the processor cores are defective. It is not necessary to disable communication ramps to isolate individual functional units of the multiprocessor during a special scan test sequence because defects in one functional unit will not contaminate test results from other areas of the chip. Therefore, a special scan sequence is inherently an isolation test.

A rambus test sequence tests the logic in Rambus logic. A rambus test is a non-isolation test. An input/output test is also a non-isolation test. An input/output test characterization patterns are run to test the quality of the analog input/output devices. A rambus test and an input/output test are not partial good tests.

A ramp logic built-in self-test, also referred to herein as a ramp test, is a test to identify a functional ramp or communication bus interface associated with a particular processing unit. A ramp logic built-in self-test may be initiated to test each ramp associated with a functional processor core in the set of identified functional processor cores in accordance with the illustrative embodiments. The ramp logic built-in self-test determines if the communication bus interface associated with a given processor core is functional.

A ramp test is an AC sequence that tests the ramp circuits for each communication bus interface, such as communication bus interface 462 and 464 in FIG. 4B. The process initiates a first test sequence with a single ramp associated with a first synergistic processor core enabled and the other ramps associated with the other synergistic processor cores. In accordance with an illustrative embodiment, the primary processor core is not disabled because any fail in the primary processor core or non-synergistic processor chip would result in a non-salvageable multiprocessor chip.

The ramp test process enables the first ramp by providing an input chain with a bit sequence specifying the first ramp is enabled. The process then initiates a second test sequence with a second ramp associated with a second synergistic processor core enabled and the first ramp and all other ramps associated with the other synergistic processor cores disabled. The process continues to initiate test sequences with only a single ramp enabled until each ramp has been tested.

In other words, during ramp logic built-in self test, a communication bus interface associated with a given processor core that has not been identified as a non-functional processor core is enabled. Every other communication bus interface associated with every other processor core on the multiprocessor is disabled.

For example, in the multiprocessor depicted in FIG. 4, the process runs eight test sequences with one processor core ramp enabled and seven other processor core ramps disabled. Each of the eight tests has a different ramp-enable bit set, depending on which ramp is enabled.

In accordance with an illustrative embodiment, a ramp associated with a synergistic processor core that has already been identified as a defective synergistic processor core is not tested. Thus, using FIG. 4A as an example, if synergistic processor core 418 was previously identified as a defective processor core, the process will only run seven sequences of the ramp test to test ramps associated with other synergistic processor cores 412, 414, 416, 420, 424, and 426. The process will not run a sequence in which a ramp associated with defective processor core 418 and 422 are enabled.

Moreover, during the ramp test performed in accordance with this illustrative embodiment, ramp 462 associated with synergistic processor core 420 is enabled. Synergistic processor core 418 is an identified defective processor core. Therefore, all fourteen of the fifteen signatures generated during this test will be compared to the expected signature values with the exception of the signature generated by synergistic processor core 418. The signature associated with synergistic processor core 418 is disregarded because this synergistic processor core is known to be a defective core. Thus, in this example, the process will run seven ramp test sequences with a different ramp enabled during each test sequence to determine if each ramp associated with synergistic processor cores 412, 414, 416, 420, 422, 424, and 426 are functional ramps.

A functional processor core can be removed from the set of identified functional processor cores if a determination is made that a communication bus interface associated with the given processor core is not functional.

In accordance with another embodiment, a threshold number of functional processor cores is selected. Then a determination is made as to whether the number of defective processor cores exceeds the threshold number of functional processor cores. If a determination is made that the number of defective processor cores exceeds the threshold number of functional processor cores, the multiprocessor is not salvageable. However, if the number of nonfunctional processor cores is less than the threshold number of functional processor cores, the chip can be considered a partially good chip capable of functioning for an intended purpose of the multiprocessor. In other words, the number of functional processor cores must meet or exceed the threshold number of functional processor cores in order to be considered a partial good chip at the end of the testing process.

If a chip is considered to be a partial good chip after the set of isolation tests and non-isolation tests are complete, the test process initiates blowing of a fuse associated with each defective processor core to disable each defective processor core. However, if the number of defective processor cores does not exceed the threshold, then the multiprocessor is a partial good chip capable of utilization for an intended purpose.

Figure 6:
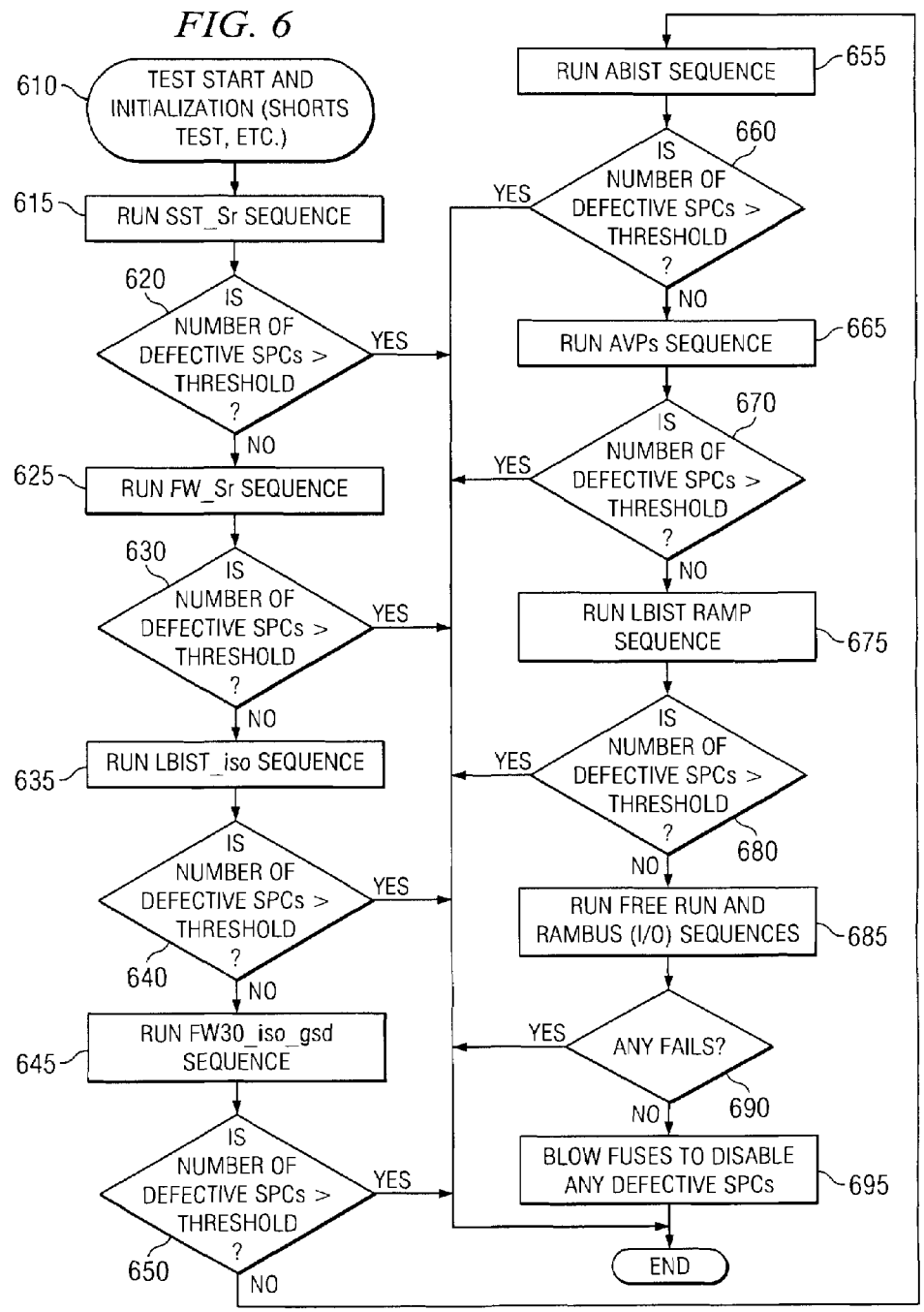
FIG. 6 depicts an exemplary flowchart of a process for testing multiprocessor chips in accordance with an illustrative embodiment.

FIG. 6 is an exemplary flowchart of a process for testing multiprocessor chips in accordance with an illustrative embodiment. The process is executed by tester 500 in FIG. 5 on a multiprocessor chip having eight synergistic processor cores, such as multiprocessor 400 in FIG. 4. However, the process illustrated may be adapted to test a multiprocessor having any number of synergistic processor cores.

The process begins with a test start and initialization (step 610). The process runs a special scan test sequence "SST_sr" to test the "Power-On Reset" sequence to activate the multiprocessor safely (step 615). During this test, a total of eleven input scan chains and a total of eighteen output scan chains are are run through each synergistic processor core. Each synergistic processor core has one dedicated ouput scan chain. The synergistic processor cores share a common input scan chain which fans out to each synergistic processor core.

The scan chains output as a result of this test sequence are interpreted and analyzed to determine if any of the processor cores are defective. If a determination is made that the number of bad or defective synergistic processor cores is greater than a threshold specified number of functional synergistic processor cores (step 620), the process terminates.

If the number of bad or defective synergistic processor cores is not greater than the threshold, the process initiates a full wafer scan test "FW_sr" (step 625). A full wafer scan is an inherently isolated test sequence. After running the full wafer scan, the process determines if the number of bad synergistic processor cores identified is greater than the threshold (step 630). If the number of bad synergistic processor cores is greater than the threshold, the process ends. If the number of bad synergistic processor cores is not greater than the threshold, the process initiates an LBIST isolation test sequence "LBIST_iso" (step 635).

During an LBIST isolation sequence, the process runs ten AC sequences with the ramps disabled. An LBIST isolation sequence is run for each processor core in the multiprocessor. The process then determines if the number of identified defective synergistic processor cores identified is greater than the threshold (step 640). If the number of bad synergistic processor cores is greater than the threshold, the process ends. If the number of bad synergistic processor cores is not greater than the threshold, the process initiates a full wafer isolation general scan design test sequence "FW30_iso_gsd" (step 645). After running the full wafer scan, the process then determines if the number of bad synergistic processor cores identified is greater than the threshold (step 650).

If the number of bad synergistic processor cores is greater than the threshold, the process ends. If the number of bad synergistic processor cores is not greater than the threshold, the process initiates an array built-in self-test test sequence "ABIST" (step 655) to test on-chip memory arrays. The process does not take any special actions to isolate synergistic processor cores because test results indicating a defect in one functional unit of the multiprocessor will not contaminate the test results generated by other functional units. The process then determines if the number of bad synergistic processor cores identified by the array built-in self-test sequence is greater than the threshold (step 660).

If the number of bad synergistic processor cores is greater than the threshold, the process ends. If the number of bad synergistic processor cores is not greater than the threshold, the process initiates an architectural verification program "AVP" sequence (step 665). The process does not take any special actions to isolate synergistic processor cores because architectural verification program test results indicating a defect in one functional unit of the multiprocessor will not contaminate the test results generated by other functional units.

The process then determines if the number of bad synergistic processor cores identified is greater than the threshold (step 670). If the number of bad synergistic processor cores is greater than the threshold, the process ends. If the number of bad synergistic processor cores is not greater than the threshold, the process runs a ramp test sequence "LBIST ramp" (step 675).

The process then determines if the number of bad synergistic processor cores identified is greater than the threshold (step 680). If the number of bad synergistic processor cores is greater than the threshold, the process ends. If the number of bad synergistic processor cores is not greater than the threshold, the process tests the freerunning logic "FREERUN." Freerun tests logic that is not active during normal testing. This is a non-isolation test.

The process also tests input/output controllers on the chip by running a "RAMBUS" sequence (step 685). The rambus sequence tests the logic in the rambus input/output controllers. The process also runs an "I/O" test. I/O test runs characterization patterns to test the quality of the I/O devices. The rambus test and I/O test are both non-isolation tests.

In addition, other miscellaneous test sequences may also be performed to test other non-critical or non-trivial logic. The process can generally initiate other miscellaneous non-isolation tests without isolating the synergistic processor cores.

After the non-isolation tests run during step 685 result in a fail, the process ends. If the non-isolation tests do not indicate any fails, the process determines a number of failed synergistic processor cores identified during the testflow. The process blows a fuse associated with each failed synergistic processor core to disable the defective processing units (step 695), with the process terminating thereafter. A multiprocessor in which one or more failed synergistic processor cores has been disabled and a threshold number of synergistic processor cores remains functional is a partial good multiprocessor. In accordance with an illustrative embodiment, a report is printed detailing the health of the multiprocessor chip and specifying which synergistic processor cores are functional good cores and which cores are disabled.

If any number of failed synergistic processor cores is identified, the process disables the failed synergistic processor cores by blowing fuses to each failed synergistic processor core (step 695) with the process terminating thereafter.

Information regarding identified defective synergistic processor cores can be stored in the multiprocessor by blowing fuses to identified defective processor cores and disabling those dentified defective synergistic processor cores. In accordance with this illustrative embodiment, eFuse is utilized to disable the identified defective processing cores. The eFuse data can be detected by software to take appropriate action to ignore the defective processing cores. In accordance with an illustrative embodiment, an eFuse pattern is run through the multiprocessor to blow the eFuses.

The testflow illustrated in FIG. 6 can be adapted to test for a specified number of functional synergistic processor cores, where the specified number ranges from zero to a total number of synergistic processor cores in a multiprocessor being tested. For example, if zero functional synergistic processor cores are specified, a multiprocessor with zero functional synergistic processor cores is considered a partial good multiprocessor capable of utilization with the primary processor as the sole functional processing core.

The illustrative embodiments of the present invention are not limited to the specific sequence of tests illustrated in FIG. 6. The sequence of tests depicted in FIG. 6 could be performed in a variety of different sequences in accordance with the illustrative embodiments of the present invention. In addition, other tests not depicted in FIG. 6 for testing a multiprocessor chip could be added to the sequence or tests that are depicted could be omitted from the sequence of tests depicted in FIG. 6 without departing from the spirit and scope of the illustrative embodiments.

In addition, the illustrative embodiments are not limited to identifying partial good quality in processing units of multiprocessors. The aspects of the illustrative embodiments can be implemented to perform partial good testing using isolation test sequences to identify and/or isolate defective functional units and/or functional units with partial good quality within a multiprocessor. For example, referring to FIG. 4A, the illustrative embodiments of the present invention can be implemented to perform partial good testing to determine if one or more functional units, such as functional units memory controller 450, input/output controller 440 and 445, level two cache 460, processor bus 430, circuits, or any other functional unit depicted in FIGS. 3, 4A, and 4B, are defective.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The illustrative embodiments provide a computer implemented method, apparatus, and computer usable code for testing multiprocessors for partial good quality. By detecting whether a multiprocessor is a partial good processor as opposed to a wholly defective processor, the illustrative embodiments permit a higher yield of functional or usable multiprocessor chips to be realized during manufacture of multiprocessor chips. Moreover, nonfunctional or defective processing unit(s) within a partial good multiprocessor chip can be isolated and disabled to permit increased power savings during utilization of partial good multiprocessors.

The illustrative embodiments can take the form of an entirely hardware embodiment, an entirely software embodiment or an embodiment containing both hardware and software elements. The illustrative embodiments are implemented in software, which includes but is not limited to firmware, resident software, microcode, etc.

Furthermore, the illustrative embodiments can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the illustrative embodiments have been presented for purposes of illustration and description, and is not intended to be exhaustive or limited to the illustrative embodiments in the form disclosed. Many modifications and variations will be apparent to those of ordinary skill in the art. The embodiment was chosen and described in order to best explain the principles of the illustrative embodiments, the practical application, and to enable others of ordinary skill in the art to understand the illustrative embodiments for various embodiments with various modifications as are suited to the particular use contemplated.

What is claimed is:

1. A computer implemented method for testing a first set of communication bus interfaces and a first set of processor cores in a multiprocessor, the computer implemented method comprising:

initiating testing on the first set of processor cores on the multiprocessor in which the first set of communication bus interfaces is enabled to allow test results from the first set of processor cores to be communicated to a processor bus, and a second set of communication bus interfaces associated with a second set of processor cores not being tested are disabled such that the second set of processor cores can receive an input data from the processor bus but cannot send an output to the processor bus, wherein enabling the first set of communication bus interfaces and disabling the second set of communication bus interfaces are in accordance with a set of isolation test sequences;

identifying a set of functional processor cores in the set of processor cores based upon the test results; and initiating a logic built-in self-test to test a communication bus interface in the first set of communication bus interfaces associated with a given functional processor core in the set of functional processor cores, wherein the communication bus interface in the first set of communication bus interfaces is enabled and wherein the logic built-in self-test determines if the communication bus interface in the set of communication bus interfaces associated with the given functional processor core in the set of functional processor cores is functional.

2. The computer implemented method of claim 1 wherein the communication bus interface in the set of communication bus interfaces associated with the given functional processor core is enabled and each other communication bus interface in the set of communication bus interfaces associated with each other processor core on the multiprocessor is disabled.

3. The computer implemented method of claim 1 wherein a functional processor core is removed from the set of identified functional processor cores if a determination is made that the communication bus interface in the set of communication bus interfaces associated with a given processor core is not functional.

4. The computer implemented method of claim 1 wherein a given processor core cannot send output if a communication bus interface in the set of communication bus interfaces associated with the given processor core is disabled.

5. The computer implemented method of claim 1 wherein the set of isolation tests comprises the logic built-in self-test isolation test, a full wafer isolation general scan design test, an away logic built-in self-test, architectural verification logic, a special scan test, and a ramp logic built-in self-test.

6. The computer implemented method of claim 1 further comprising:
   initiating a set of non-isolation tests.

7. The computer implemented method of claim 6 wherein the set of non-isolation test sequences comprises a freerun test, a rambus test, and an input/output test.

8. The computer implemented method of claim 1 further comprising:
   selecting a threshold number of functional processor cores; and
   determining whether a number of defective processor cores exceeds the threshold number of functional processor cores, wherein the multiprocessor is not salvageable if the number of nonfunctional processor cores exceeds the threshold.

9. The computer implemented method of claim 8 further comprising:
   blowing a fuse associated with each defective processor core to disable each defective processor core if the number of defective processor cores does not exceed the threshold.

10. The computer implemented method of claim 9 wherein eFuse is utilized to disable each defective unit in the set of defective units.

11. The computer implemented method of claim 1 further comprising:
    initiating a set of isolation test sequences at a second level on a processing unit; and
    initiating a set of non-isolation test sequences at the second level on the processing unit, wherein a determination is made as to whether the processing unit is a partial good processing unit based on a result of the set of isolation test sequences and a result of the set of non-isolation test sequences.

12. The computer implemented method of claim 1 wherein the multiprocessor is heterogeneous.

13. A computer program product comprising:
    a computer readable storage medium having stored thereon computer usable program code for testing a first set of communication bus interfaces and a first set of processor cores in a multiprocessor, the computer program product comprising:
    computer usable program code for initiating testing on the first set of processor cores on the multiprocessor in which the first set of communication bus interfaces is enabled to allow test results from the first set of processor cores to be communicated to a processor bus, and a second set of communication bus interfaces associated with a second set of processor cores not being tested are disabled such that the second set of processor cores can receive an input data from the processor bus but cannot send an output to the processor bus, wherein enabling the first set of communication bus interfaces and disabling the second set of communication bus interfaces are in accordance with a set of isolation test sequences;
    computer usable program code for identifying a set of functional processor cores in the set of processor cores based upon the test results; and
    computer usable program code for initiating a logic built-in self-test to test a communication bus interface in the first set of communication bus interfaces associated with a functional processor core in the set of functional processor cores, wherein the communication bus interface in the first set of communication bus interfaces is enabled and wherein the logic built-in self-test determines if the communication bus interface from the set of communication bus interfaces associated with the functional processor core in the set of functional processor cores is functional.

14. The computer program product of claim 13 wherein the communication bus interface in the set of communication bus interfaces associated with a given functional processor core is enabled and each other communication bus interface in the set of communication bus interfaces associated with each other processor core on the multiprocessor is disabled.

15. The computer program product of claim 13 wherein a functional processor core is removed from the set of identified functional processor cores if a determination is made that the communication bus interface from the set of communication bus interfaces associated with a given processor core is not functional.

16. The computer program product of claim 13 wherein a given processor core cannot send output if a communication bus interface from the set of communication bus interfaces associated with the given processor core is disabled.

17. The computer program product of claim 13 wherein the set of isolation tests comprises a logic built-in self-test isolation test, a full wafer isolation general scan design test, an away logic built-in self-test, architectural verification logic, a special scan test, and a ramp logic built-in self-test.

18. The computer program product of claim 13 further comprising:
    computer usable program code for initiating a set of non-isolation tests.

19. The computer program product of claim 13 further comprising:
    computer usable program code for selecting a threshold number of functional processor cores; and
    computer usable program code for determining whether a number of defective processor cores exceeds the number of functional processor cores, wherein the multiprocessor is not salvageable if the number of nonfunctional processor cores exceeds the threshold.

20. An apparatus for testing first set of communication bus interfaces and a first set of processor cores in a multiprocessor, the apparatus comprising:
    a computer comprising:
    a processor bus;
    a storage device connected to the processor bus, wherein the storage devices contains a computer usable program product;
    a processor unit, wherein the processor unit executes the computer usable program product to initiate testing on the first a set of processor cores on the multiprocessor in which the first set of communication bus interfaces is enabled to allow test results from the first set of processor cores to be communicated to the processor bus, and a second set of communication bus interfaces associated with a second set of processor cores not being tested are disabled such that the second set of processor cores can receive an input data from the processor bus but cannot send an output to the processor bus, wherein enabling the first set of communication bus interfaces and disabling the second set of communication bus interfaces are in accordance with a set of isolation test sequences; identify a set of functional processor cores in the set of processor cores based upon the test results; and initiate a logic built-in self-test to test a communication bus interface in the first set of communication bus interfaces associated with a functional processor core in the set of functional processor cores, wherein the communication bus interface in the first set of communication bus interfaces is enabled and wherein the logic built-in self-test determines if the communication bus interface from the set of communications bus interfaces associated with the functional processor core in the set of functional processor cores is functional.

* * * * *

UNITED STATES PATENT AND TRADEMARK OFFICE
CERTIFICATE OF CORRECTION

PATENT NO. : 7,610,537 B2 Page 1 of 1
APPLICATION NO. : 11/278615
DATED : October 27, 2009
INVENTOR(S) : Dickinson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 682 days.

Signed and Sealed this

Twelfth Day of October, 2010

David J. Kappos
*Director of the United States Patent and Trademark Office*